United States Patent

Rainey et al.

[11] Patent Number: 6,113,970
[45] Date of Patent: Sep. 5, 2000

[54] LECITHIN BASED SPRAY PRODUCT

[75] Inventors: Karin Maria Rainey; Girish Nath Desai, both of Ellicott City; Benjamin Sander, Catonsville, all of Md.

[73] Assignee: Lipton, division of Conopco, Inc., Englewood Cliffs, N.J.

[21] Appl. No.: 09/015,556

[22] Filed: Jan. 29, 1998

Related U.S. Application Data

[60] Provisional application No. 60/036,860, Feb. 3, 1997.

[51] Int. Cl.$^7$ ........................................ A23D 7/00
[52] U.S. Cl. .......................... 426/601; 426/609; 426/811; 426/116; 426/662; 106/243
[58] Field of Search ..................... 426/601, 602, 426/609, 611, 811, 116, 662; 106/243

[56] References Cited

U.S. PATENT DOCUMENTS

| | | | |
|---|---|---|---|
| 3,443,966 | 5/1969 | Reid | 426/601 |
| 3,490,923 | 1/1970 | Eiseman | 426/116 |
| 3,906,117 | 9/1975 | Gawrilow | 426/362 |
| 4,034,124 | 7/1977 | van Dam | 426/602 |
| 4,096,258 | 6/1978 | Hanson | 426/250 |
| 4,108,678 | 8/1978 | Szuhaj | 426/811 |
| 4,127,419 | 11/1978 | Szuhaj | 106/243 |
| 4,142,003 | 2/1979 | Sejpal | 426/609 |
| 4,163,676 | 8/1979 | Konigsbacher | 106/243 |
| 4,188,412 | 2/1980 | Sejpal | 426/609 |
| 4,371,451 | 2/1983 | Scotti | 252/305 |
| 4,524,085 | 6/1985 | Purves | 426/601 |
| 4,528,201 | 7/1985 | Purves | 426/601 |
| 4,547,388 | 10/1985 | Strouss | 426/811 |
| 4,788,068 | 11/1988 | Konishi | 426/604 |
| 4,943,389 | 7/1990 | Weete | 252/308 |
| 4,985,272 | 1/1991 | Grootscholten et al. | 426/609 |
| 5,008,037 | 4/1991 | Weete | 252/314 |
| 5,079,028 | 1/1992 | Wieske | 426/662 |
| 5,296,021 | 3/1994 | Clapp | 426/811 |
| 5,374,434 | 12/1994 | Clapp | 426/116 |
| 5,397,592 | 3/1995 | Vermaas | 426/662 |
| 5,431,719 | 7/1995 | Clapp | 426/609 |
| 5,455,055 | 10/1995 | Stoltz | 426/609 |
| 5,503,866 | 4/1996 | Wilhelm, Jr. | |
| 5,567,456 | 10/1996 | Clapp | 426/662 |
| 5,650,185 | 7/1997 | Stoltz | 426/609 |
| 5,660,865 | 8/1997 | Pedersen | 426/601 |
| 5,662,956 | 9/1997 | Knightly | 426/662 |

OTHER PUBLICATIONS

Lopez 1975 A Complete Course in Canning 10$^{th}$ Edition The Canning Trade Baltimore Md pp. 334–338.

Food Chemistry, Second Edition, by Owen R. Fennema (1985) pp. 145–146.

*Primary Examiner*—Carolyn Paden
*Attorney, Agent, or Firm*—Matthew Boxer

[57] ABSTRACT

A food composition dispensed by a spraying mechanism comprising an oil phase comprising 10 to 80 wt. % of an edible oil based on total composition, 1 to 5 wt. % lecithin, an effective amount of an emulsifier, and an aqueous phase comprising an acidifier and water.

5 Claims, No Drawings

LECITHIN BASED SPRAY PRODUCT

This application claims the benefit of U.S. Provisional Application No. 60/036,860 filed Feb. 3, 1997.

FIELD OF THE INVENTION

The present invention pertains to a composition with multifunctional aspects based on lecithin which is useful for coating food contact surfaces, preferably by spraying the compositions.

BACKGROUND OF THE INVENTION

Spray products for dispensing food compositions onto food contact surfaces are well in the art. However, many of these compositions utilize an aerosol dispenser and/or require the presence of organic solvents for dispensing.

The present compositions do not use an aerosol dispenser and do not require the presence of volatile solvents for dispensing.

The following is a description a publication in the art.

U.S. Pat. No. 5,503,866 owned by Mallott and Company (1996) describes a lecithin based release composition which comprises at least 8% by weight lecithin combined with at least 5 wt. % edible oil, and emulsifier and water.

Such a high level of lecithin provides an expensive product which is not commercially viable and therefore the present invention provides a composition which has a lower level of lecithin and which has multifunctional applications including topping and basting, which are apart from pan coating.

SUMMARY OF THE INVENTION

The invention is a spray composition which comprises up to 5% by weight, preferably 1 to 4 wt. %, lecithin, 10 to 80 wt. % of an edible oil, and 20 to 90 wt. % of an aqueous phase.

DETAILED DESCRIPTION OF PREFERRED EMBODIMENTS

The present invention is based on an oil phase containing up to 80 wt. % of an edible oil and only up to about 5 wt. %, preferably 1 to 4 wt. % lecithin.

The edible oil or fat may be any oil or fat known in the art such as animal or vegetable sources. The oil or fat is preferably unhydrogenated or may include partially hydrogenated, fractionated or interesterified oil or fat. Preferably the oil is liquid at room temperature and is from a vegetable source.

As used herein, lecithin means any phospholipid; that is any lipid containing phosphoric acid as a mono or diester. "Glycerophospholipid" signifies any derivative of glycerophosphoric acid that contains an O-acyl, O-alkyl, or O-alkenyl group attached to the glycerol residue. The common glycerophospholipids are named as derivatives of phosphatidic acid, such as 3-sn-phosphatidylcholine (trivial name, lecithin), or by their sysematic name, similar to the system for triacylglycerols. The term "phospho" is used to indicate the phosphodiester bridge. Lecithins are described in Food Chemistry, Ed., Owen R. Fennema, (1985) which is hereby incorporated by reference.

The lecithin component is combined with any other conventional emulsifier or emulsifiers and oil to provide a stable emulsifier system. The lecithin should be present only in an amount up to 5 wt. %, preferably 1 to 4 wt. %. Additionally, the emulsifiers aid in oil in water emulsion. The emulsifiers can be added into oil phase or water phase.

Compositions of the invention may optionally contain up to 5 wt % protein, wherein the protein is derived from a vegetable or an animal source. Preferred proteins are of animal origin, and most preferred proteins are dairy proteins present in dairy ingredients such as whey, buttermilk, non fat dry milk, and yogurt.

The product can be prepared by any conventional method known in the art.

The product is a water continuous emulsion comprising an aqueous phase and an oil phase. The oil phase is prepared by adding all the phase components in a tank and mixing. The aqueous phase is prepared by combining water xanthan gum, whey and color in a high shear mixer. The preferred equipment is a triblender which allows the dry ingredients to disperse without forming clumps. The mixture is then heated by passing the aqueous phase through an efficient heat transfer unit, preferably a plate heat exchanger to a temperature of 185 F to pasteurize the aqueous phase. After pasteurization, the remaining aqueous components are added. The aqueous and oil phases are combined and pumped through another heat exchanger, preferably a plate heat exchanger, to cool the emulsion to 45F–50F. The mixture is then pumped to an emulsifying unit, preferably a colloid mill, to form a fine oil in water emulsion. The emulsion is packed in a non aerosol package which has a dispensing pump which delivers the product to the host food or to a cooking utensil such as a pan. The product is delivered in the form of a fine spray.

A more detailed description of the preparation of a composition of the invention is as follows:

EQUIPMENT AND PROCESSING

Aqueous Prep-Aqueous Concentrate Tank-Pump-PHE-Aqueous Mix Tank-Pump-Aqueous Storage Tank-Pump-Churn Tank.
PHE Temp.=181° F.
Pasteurization Hold Time=1–2 sec.
Holding Tube Exit Temp.=150° F.
Aqueous Storage Tank Temp.=140° F.
Aqueous pH=3.7
Note:
  Water, Xanthan Gum, Whey Powder, and Beta Carotene are added in the aqueous concentrate tank;
  Brine, EDTA, Pot Sorbate, and Lactic Acid are added in the Aqueous Mix Tank
Oil Prep-Oil Blending Tank-Pump-Oil Holding Tank-Pump-Churn Tank Emulsion Prep-Churn Tank-Pump-Run Tank-Pump-PHE-Colloid Mill-Fill
Run Tank Temp.=130° F.
PHE Exit Temp.=46° F.
Colloid Mill Gap=0.010"
pH=4.1

An example of the product is as follows:

EXAMPLE 1 formulation:

| oil phase: | |
|---|---|
| bean oil | 45.60 |
| lecithin | 3.00 |

|  |  |
|---|---|
| -continued | |
| polysorbate 60 | 0.40 |
| (polyoxy ethylene sorbitan monostearate) | |
| flavor | trace |
| EDTA | trace |
| subtotal | 49.00 |
| aqueous phase: | |
| water | 44.80 |
| salt | 5.00 |
| whey powder | 0.75 |
| xanthan gum | 0.17 |
| lactic acid | 0.16 |
| potassium sorbate, | 0.11 |
| color (beta carotene) | trace |
| subtotal | 51.00 |
| total | 100.00 |

This composition is made by conventional means and as described herein.

We claim:

1. A food composition which is an oil in water emulsion and which is dispensed by a spraying mechanism wherein said food composition comprises:
   (i) 10 to 80 wt. % of an edible oil based on total composition,
   (ii) 1 to 5 wt. % lecithin,
   (iii) an effective amount of an emulsifier,
   (iv) an acidifier, and
   (v) water,
      And wherein the aqueous phase is in range of 20–90 wt. %, and the food composition comprises at least some protein in an amount up to 5 wt % protein, the protein being derived from a vegetable or an animal.

2. The food composition according to claim 1 wherein the lecithin is present in an a amount of 2 to 4 wt. %.

3. The food composition according to claim 1 wherein the emulsifier is from a group which favors oil in water emulsion.

4. A composition according to claim 1 wherein the protein is dairy protein.

5. A composition according to claim 4 the dairy protein is present in dairy ingredients selected from the group consisting of whey, buttermilk, non fat dry milk, and yogurt.

* * * * *